United States Patent
Fukuhara et al.

(10) Patent No.: US 9,777,080 B2
(45) Date of Patent: Oct. 3, 2017

(54) DISPERSION STABILIZER FOR SUSPENSION POLYMERIZATION, AND MANUFACTURING METHOD FOR VINYL RESIN

(71) Applicant: KURARAY CO., LTD., Kurashiki-shi (JP)

(72) Inventors: Tadahito Fukuhara, Kurashiki (JP); Yousuke Kumaki, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 14/415,329

(22) PCT Filed: Jul. 17, 2013

(86) PCT No.: PCT/JP2013/069375
§ 371 (c)(1),
(2) Date: Jan. 16, 2015

(87) PCT Pub. No.: WO2014/014009
PCT Pub. Date: Jan. 23, 2014

(65) Prior Publication Data
US 2015/0191558 A1 Jul. 9, 2015

(30) Foreign Application Priority Data

Jul. 19, 2012 (JP) .................................. 2012-160995

(51) Int. Cl.

| | | |
|---|---|---|
| C08F 14/06 | (2006.01) | |
| C08F 2/20 | (2006.01) | |
| C08F 8/12 | (2006.01) | |
| C08F 114/06 | (2006.01) | |
| C08F 118/08 | (2006.01) | |
| C08F 214/18 | (2006.01) | |
| C08F 18/00 | (2006.01) | |
| C08L 29/04 | (2006.01) | |
| C08F 116/06 | (2006.01) | |
| C08F 16/06 | (2006.01) | |
| C08F 18/08 | (2006.01) | |
| C08F 2/38 | (2006.01) | |

(52) U.S. Cl.
CPC ................ *C08F 14/06* (2013.01); *C08F 2/20* (2013.01); *C08F 8/12* (2013.01); *C08F 18/00* (2013.01); *C08F 114/06* (2013.01); *C08F 118/08* (2013.01); *C08F 214/18* (2013.01); *C08L 29/04* (2013.01); *C08F 2/38* (2013.01); *C08F 16/06* (2013.01); *C08F 18/08* (2013.01); *C08F 116/06* (2013.01); *C08L 2205/025* (2013.01)

(58) Field of Classification Search
None
See application file for complete search history.

(56) References Cited

U.S. PATENT DOCUMENTS

| | | | | |
|---|---|---|---|---|
| 4,845,174 A | * | 7/1989 | Amano | .................... C08F 2/004 526/200 |
| 5,204,421 A | * | 4/1993 | Amano | .................... C08F 14/06 526/200 |
| 5,349,008 A | | 9/1994 | Takada et al. | |
| 2005/0197476 A1 | * | 9/2005 | Ooura | .................... C08F 114/06 526/344 |
| 2009/0111940 A1 | * | 4/2009 | Kato | .................... B01F 17/0028 525/60 |
| 2010/0184917 A1 | * | 7/2010 | Kato | ........................ C08F 2/18 525/56 |

FOREIGN PATENT DOCUMENTS

| | | |
|---|---|---|
| JP | 54 25990 | 2/1979 |
| JP | 62 246903 | 10/1987 |
| JP | 63 171628 | 7/1988 |
| JP | 1 240501 | 9/1989 |
| JP | 4 117402 | 4/1992 |
| JP | 07062006 A * | 3/1995 |
| JP | 9 77807 | 3/1997 |
| JP | 09077807 A * | 3/1997 |

(Continued)

OTHER PUBLICATIONS

U.S. Appl. No. 14/653,065, filed Jun. 17, 2015, Fukuhara, et al.
International Search Report dated Oct. 29, 2013 in PCT/JP13/069375 Filed Jul. 17, 2013.
U.S. Appl. No. 14/439,868, filed Apr. 30, 2015, Fukuhara, et al.
Extended European Search Report dated Apr. 4, 2016 in Patent Application No. 13819986.4.

*Primary Examiner* — Richard A Huhn
(74) *Attorney, Agent, or Firm* — Oblon, McClelland, Maier & Neustadt, L.L.P.

(57) ABSTRACT

A dispersion stabilizer for suspension polymerization of vinyl compounds comprising a vinyl alcohol polymer (A) which has a saponification degree of 30 mol % or more and less than 60 mol % and a viscosity-average polymerization degree (P) of more than 200 and less than 600, and has a terminal alkyl group having 6 to 18 carbon atoms, and in which a content of monomer units having an oxyalkylene group is 0.3 mol % or less and the relationship between the viscosity-average polymerization degree (P) and a modification rate (S) (mol %) of the alkyl group satisfies Formula (1). Thus, there can be provided a dispersion stabilizer for suspension polymerization with which, during suspension polymerization of vinyl compounds including vinyl chloride, even when it is used in a small amount, the absorbency of a plasticizer is high, resulting in easy processing and formation of coarse particles is little and the remaining monomer components can be easily removed.

$$50 \leq S \times P / 1.880 < 100 \quad (1)$$

7 Claims, No Drawings

(56) References Cited

FOREIGN PATENT DOCUMENTS

| | | |
|---|---|---|
| JP | 9 100301 | 4/1997 |
| JP | 9 249702 | 9/1997 |
| JP | 10 147604 | 6/1998 |
| JP | 10 168128 | 6/1998 |
| JP | 10 259213 | 9/1998 |
| JP | 11 217413 | 8/1999 |
| JP | 2001 40019 | 2/2001 |
| JP | 2001-233904 A | 8/2001 |
| JP | 2002 69105 | 3/2002 |
| JP | 2002-69105 A | 3/2002 |
| JP | 2007 63369 | 3/2007 |

* cited by examiner

DISPERSION STABILIZER FOR SUSPENSION POLYMERIZATION, AND MANUFACTURING METHOD FOR VINYL RESIN

TECHNICAL FIELD

The present invention relates to a dispersion stabilizer for suspension polymerization for vinyl compounds and a production process therefor. The present invention also relates to a method for manufacturing a vinyl resin comprising conducting suspension polymerization of vinyl compounds in the presence of a dispersion stabilizer for suspension polymerization.

BACKGROUND ART

It has been known that a partially-saponified vinyl alcohol polymer (hereinafter, vinyl alcohol polymer is sometimes abbreviated as "PVA") is used as a dispersion stabilizer for suspension polymerization of vinyl compounds (for example, vinyl chloride).

However, the use of a common partially-saponified PVA does not always satisfy the requirements; specifically, (1) even using a small amount, a high absorbency of a plasticizer can be achieved, resulting in easy processing, (2) the remaining monomer components can be easily removed, and (3) formation of coarse particles is reduced.

For achieving the above required properties, there have been proposed the use of, for example, a PVA with a low polymerization degree and a low saponification degree which has side chains having oxyalkylene groups, as a dispersion stabilizer for suspension polymerization for vinyl compounds (see Patent Reference Nos. 1 to 7), the use of a PVA having ionic groups (see Patent Reference Nos. 7 to 8), and the use of a PVA having alkyl groups with a saponification degree of more than 98 mol % (see Patent Reference No. 9). These various PVAs are highly water-soluble and easily handleable.

The above requirements (1) to (3) have, however, become stricter. Therefore, the methods using various PVAs as described in Patent Reference Nos. 1 to 9 have not been satisfactorily effective for achieving performance required at present. In particular, the requirement in terms of removal of monomer components described in (2) is very strict, for example, in production of a rigid polyvinyl chloride where polymerization is conducted at a temperature of 60° C. or higher.

In general, compared to a polyvinyl chloride produced by polymerization at a temperature lower than 60° C., a rigid polyvinyl chloride produced by polymerization at a temperature of 60° C. or higher has a problem that vinyl chloride monomers remaining in polyvinyl chloride particles cannot be easily removed in a drying process after polymerization so that prolonged drying under severe conditions is required for removing the remaining monomers. Therefore, there are very strong needs for saving in energy and time in the process for removing the remaining monomers. Thus, there is needed a dispersion stabilizer which allows a large amount of the remaining monomers to be removed in a shorter time. At present, there are no dispersion stabilizers which satisfy the requirements, including the various PVAs described in Patent Reference Nos. 1 to 9.

PRIOR ART REFERENCES

Patent References

Patent Reference No. 1: JP1997-100301 A
Patent Reference No. 2: JP1998-147604 A
Patent Reference No. 3: JP1998-259213 A
Patent Reference No. 4: JP1999-217413 A
Patent Reference No. 5: JP2001-040019 A
Patent Reference No. 6: JP2002-069105 A
Patent Reference No. 7: JP2007-063369 A
Patent Reference No. 8: JP1998-168128 A
Patent Reference No. 9: JP1989-240501 A

SUMMARY OF THE INVENTION

Problem to be Solved by the Invention

An objective of the present invention is to provide a dispersion stabilizer for suspension polymerization with which, during suspension polymerization of vinyl compounds including vinyl chloride, even when it is used in a small amount, the absorbency of a plasticizer is high, resulting in easy processing and formation of coarse particles is little and the remaining monomer components can be easily removed.

Means for Solving Problem

We have found that the above objective is accomplished by a dispersion stabilizer for suspension polymerization of vinyl compounds comprising a vinyl alcohol polymer (A) which has a saponification degree of 30 mol % or more and less than 60 mol % and a viscosity-average polymerization degree (P) of more than 200 and less than 600, and has a terminal alkyl group having 6 to 18 carbon atoms, and in which a content of monomer units having an oxyalkylene group is 0.3 mol % or less and the relationship between the viscosity-average polymerization degree (P) and a modification rate (S) (mol %) of the alkyl group satisfies Formula (1), and have achieved the present invention.

$$50 \leq S \times P/1.880 < 100 \qquad (1)$$

Thus, the present invention relates to the followings.

[1] A dispersion stabilizer for suspension polymerization of vinyl compounds comprising a vinyl alcohol polymer (A) which has a saponification degree of 30 mol % or more and less than 60 mol % and a viscosity-average polymerization degree (P) of more than 200 and less than 600, and has a terminal alkyl group having 6 to 18 carbon atoms, and in which a content of monomer units having an oxyalkylene group is 0.3 mol % or less and the relationship between the viscosity-average polymerization degree (P) and a modification rate (S) (mol %) of the alkyl group satisfies Formula (1).

$$50 \leq S \times P/1.880 < 100 \qquad (1)$$

[2] The dispersion stabilizer as described in [1], wherein a block character of the residual vinyl ester groups in the vinyl alcohol polymer (A) is 0.6 or less.

[3] The dispersion stabilizer as described in [1] or [2], further comprising a vinyl alcohol polymer (B) having a saponification degree of 65 mol % or more and a viscosity-average polymerization degree of 600 or more.

[4] The dispersion stabilizer as described in [3], wherein a mass ratio between the vinyl alcohol polymer (A) and the vinyl alcohol polymer (B) (A/B) is 10/90 to 55/45.

[5] A method for manufacturing a vinyl resin, comprising conducting suspension-polymerization of vinyl compounds in the presence of the dispersion stabilizer as described in any of [1] to [4].

[6] The method for manufacturing a vinyl resin, comprising charging a pre-prepared solution or dispersion containing the dispersion stabilizer and methanol or a compound (C) represented by general formula (I) in a reactor and then initiating suspension polymerization.

[Chemical Formula 1]

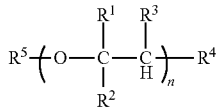

$$R^5 \left( O - \underset{R^2}{\underset{|}{\overset{R^1}{\underset{|}{C}}}} - \underset{H}{\underset{|}{\overset{R^3}{\underset{|}{C}}}} \right)_n R^4 \quad (I)$$

wherein $R^1$, $R^2$ and $R^5$ represent, independently of each other, a hydrogen atom or an alkyl group having 1 to 6 carbon atoms; $R^3$ represents a hydrogen atom, an alkyl group having 1 to 6 carbon atoms or a hydroxyalkyl group having 1 to 6 carbon atoms; $R^4$ represents a hydrogen atom, a hydroxyl group or an alkoxyl group having 1 to 6 carbon atoms; n represents an integer of 1 to 6.

[7] The method for manufacturing a vinyl resin as described in [5] or [6], wherein the suspension polymerization is conducted at a temperature of 60° C. or higher.

Effect of the Invention

Using a dispersion stabilizer for suspension polymerization of the present invention, suspension polymerization of vinyl compounds is highly stable, so that formation of coarse particles is reduced, giving particles with a uniform particle size. Furthermore, even in a small amount, an absorbency of a plasticizer is improved, leading to higher processability, and particularly for vinyl polymer particles, a rate of removing remaining vinyl compounds per a unit time is high, providing polymer particles with excellent monomer-removal properties.

MODE FOR CARRYING OUT THE INVENTION

[Dispersion Stabilizer for Suspension Polymerization]

A dispersion stabilizer for suspension polymerization of the present invention contains a PVA(A) having a terminal alkyl group. The dispersion stabilizer for suspension polymerization may contain PVA(B) other than PVA(A) having a terminal alkyl group and a further component without departing from the scope of the present invention. There will be described these components in detail. Herein, unless otherwise stated, PVA(A) having a terminal alkyl group is sometimes simply abbreviated as PVA(A).

[PVA(A)]

It is important that PVA(A) used in the present invention has a viscosity-average polymerization degree (P) of more than 200. If PVA(A) has a viscosity-average polymerization degree (P) of 200 or less, there occur problems; for example, suspension polymerization of vinyl compounds is less stable, giving coarse vinyl polymer particles, and a uniform particle size cannot be achieved. It is also important that a viscosity-average polymerization degree (P) of PVA(A) is less than 600. If a viscosity-average polymerization degree (P) of PVA(A) is 600 or more, removal of monomer components from vinyl polymer particles produced by suspension polymerization of vinyl compounds becomes difficult, and a plasticizer absorbency of the vinyl polymer particles produced is reduced. A viscosity-average polymerization degree (P) of PVA(A) is preferably 500 or less, more preferably 400 or less.

A viscosity-average polymerization degree (P) of PVA(A) is calculated using Nakajima's equation (Akio Nakajima, "Kobunshi-Kagaku" (Polymer Science) 6 (1949)) from a limiting viscosity determined for an acetone solution of a vinyl ester polymer produced by substantially completely saponifying a PVA polymer followed by acetylization.

In the light of performance of a dispersion stabilizer, it is important that a saponification degree of PVA(A) is 30 mol % or more and less than 60 mol %. If a saponification degree of PVA(A) is less than 30 mol %, removal of monomer components from vinyl polymer particles produced by suspension polymerization of vinyl compounds becomes difficult, and a plasticizer absorbency of the vinyl polymer particles produced is reduced. A saponification degree of PVA(A) is preferably 35 mol % or more, more preferably 39 mol % or more. Again, if a saponification degree of PVA(A) is 60 mol % or more, removal of monomer components from vinyl polymer particles produced by suspension polymerization of vinyl compounds becomes difficult, and a plasticizer absorbency of the vinyl polymer particles produced is reduced. A saponification degree of PVA(A) is preferably 56 mol % or less, more preferably 55 mol % or less. A saponification degree of PVA(A) is a value determined in accordance with JIS K6726.

PVA(A) can be produced by, but not limited to, any of various methods. An exemplary production method is, for example, (i) polymerizing vinyl ester monomers in the presence of a compound having a functional group such as alcohol, aldehyde or thiol having an alkyl group as a chain transfer agent followed by saponification to give PVA(A) having a terminal alkyl group. Another exemplary method is (ii) introducing an alkyl group into PVA by a chemical reaction. Among these, a method for a dispersion stabilizer for suspension polymerization demonstrating superior performance whereby a terminal alkyl group can be economically and efficiently introduced is preferably polymerizing a vinyl ester such as vinyl acetate in the presence of a chain transfer agent having an alkyl group, particularly a thiol, followed by saponification (see JP 1982-28121 A and JP1982-105410 A).

In the light of a production efficiency of PVA(A), performance of a dispersion stabilizer and handleability, it is important that a terminal alkyl group contained in PVA(A) has 6 to 18 carbon atoms. If the carbon number of the alkyl group is less than 6, a boiling point of a chain transfer agent for introducing an alkyl group is too low, making it difficult to separate the chain transfer agent from other materials (vinyl monomers such as vinyl acetate and a solvent such as methanol) in a recovery step in a production process for PVA(A). If the carbon number is less than 6, removal of monomer components from vinyl polymer particles obtained becomes difficult and a plasticizer absorbency of the vinyl polymer particles is reduced. The carbon number of an alkyl group in PVA(A) is preferably 8 or more. If the carbon number of an alkyl group of PVA(A) is more than 18, solubility of the chain transfer agent in a solvent such as methanol which is suitably used in a polymerization process in production of PVA(A) is reduced. Therefore, in the operation that a chain transfer agent for introducing an alkyl group during polymerization is dissolved in a solvent such as methanol and the solution is sequentially added, for example, precipitation of the chain transfer agent due to lower solubility occurs, making further addition difficult. Furthermore, addition while an undissolved chain transfer agent is present results in unevenness in the polymerization reaction. The carbon number of more than 18 as described above leads to complex operation in the production process and problems on quality control of a product. The carbon number of a terminal alkyl group contained in PVA(A) is preferably 15 or less.

A terminal alkyl group of PVA(A) can have a structure including, but not limited to, a straight-chain alkyl group, a branched alkyl group, an alkyl group having a double bond and an alkyl group having a triple bond. In the light of economy and productivity of a chain transfer agent for introducing an alkyl group, a straight-chain or branched alkyl group is preferable.

Examples of a straight-chain or branched alkylthiol having 6 to 18 carbon atoms include, but not limited to, n-hexanethiol, cyclohexanethiol, adamantanethiol, n-heptanethiol, n-octanethiol, n-nonanethiol, n-decanethiol, n-undecanethiol, n-dodecanethiol, t-dodecanethiol, n-hexadecanethiol and n-octadecanethiol.

It is important that in a dispersion stabilizer for suspension polymerization of the present invention, a relationship between a viscosity-average polymerization degree (P) of PVA(A) and a molar percentage of modification (S) (mol %) of an alkyl group satisfies Formula (1).

$$50 \leq S \times P/1.880 < 100 \qquad (1)$$

The value represented by "S×P/1.880" in Formula (1) generally represents an introduction rate of a chain transfer agent having an alkyl group in the synthesis of PVA(A). It is important that "S×P/1.880" is 50 or more. If "S×P/1.880" is less than 50, removal of monomer components from vinyl polymer particles produced becomes difficult, and a plasticizer absorbency of the vinyl polymer particles produced is reduced, leading to poor performance of the dispersion stabilizer. "S×P/1.880" is preferably 60 or more, more preferably 65 or more.

It is also important that the value of Formula (1) is less than 100. PVA(A) with "S×P/1.880" of 100 or more cannot be synthesized. In a chain transfer polymerization, a main reaction is a reaction in which a chain transfer agent is introduced into only one terminal of PVA(A). Therefore, for achieving "S×P/1.880" of 100 or more, a probability of formation of PVA(A) to which two or more alkyl groups are introduced must be increased, for example, by incorporating a special operation or adding a special catalyst promoting bimolecular termination in the polymerization process for producing PVA(A). Furthermore, it is necessary to inhibit a side reaction of introducing a solvent into one terminal of PVA(A), for example, by significantly reducing a rate of polymerization or significantly reducing a ratio of a solvent used for the polymerization to a vinyl ester monomer such as vinyl acetate. Employing such operation leads to problems such as a higher cost, lower productivity and uncontrolled quality, and is thus impractical.

In Formula (1), a viscosity-average polymerization degree (P) is divided by 1.880 to convert a viscosity-average polymerization degree (P) to a number average polymerization degree (Pn). In the step of radical polymerization in synthesis of PVA(A), when a ratio of a number average polymerization degree (Pn) to a weight average polymerization degree (Pw) (Pn/Pw) is ½ assuming that polymerization has ideally proceeded, a relationship between a number average polymerization degree (Pn) and a viscosity-average polymerization degree (P) can be determined using Mark-Houwink-Sakurada equation: $[\eta]=KM^{\alpha}$, wherein $[\eta]$ is a limiting viscosity of a polymer, M is a molecular weight, and K and a are a constant. In this equation, using an α value 0.74 of polyvinyl acetate in acetone, a ratio of a viscosity-average polymerization degree (P) to a number average polymerization degree (Pn) (P/Pn) is calculated to be 1.880. Combining this ratio with a molar percentage of modification (S) (mol %) of an alkyl group, an equation generally representing an introduction rate of a chain transfer agent having an alkyl group in the synthesis of PVA(A) has been derived (see Takayuki Otsu: "Kaitei Kobunshi Gosei No Kagaku (The Chemistry of Polymer Synthesis, revised edition), 11(1979), Akio Nakajima, "Kobunshi-Kagaku" (Polymer Science) 6(1949), The Society of Polymer Science: "Kobunshi Kagaku Jikkenhou" (Experimental Methods in Polymer Science)).

A modification rate (S) (mol %) of an alkyl group described above was determined by $^1$H-NMR. For example, for PVA(A) into which an alkyl group is introduced using n-dodecanethiol, first, an n-dodecanethiol-modified vinyl ester polymer is thoroughly purified by reprecipitation using a mixed solvent of n-hexane/acetone three times or more, dried at 50° C. under a reduced pressure for 2 days to give an analysis sample of a n-dodecanethiol-modified vinyl ester polymer. Next, the sample is dissolved in $CDCl_3$ and analyzed by $^1$H-NMR spectrometry at room temperature. From an area of peak α derived from a proton in a main methine chain in the above vinyl ester monomer unit (4.7 to 5.2 ppm) and an area of peak β derived from a proton in a terminal methyl group as a characteristic peak in a n-dodecanethiol structure (0.8 to 1.0 ppm), a modification rate (S) (mol %) can be calculated using Equation (2). A characteristic peak used for the part of peak β in Equation (2) such as a chain transfer agent having a branched alkyl group varies depending on a chain transfer agent used, and therefore, an appropriate characteristic peak can be selected for the chain transfer agent. When an appropriate peak is selected, the area of peak β must be divided by the number of hydrogen atoms corresponding to the peak in Equation (2). Herein, a characteristic peak as described above refers to a peak which does not overlap another peak or in which, if it overlaps another peak, a peak area can be calculated from its relationship with the other peak.

$$\text{Modification rate(mol \%)} = \{(\text{area of peak } \beta/3)/(\text{area of peak } \alpha)\} \times 100 \qquad (2)$$

It is important that a content of monomer units having an oxyalkylene group in PVA(A) is 0.3 mol % or less; preferably it is substantially free from such monomer units. If a content of monomer units having an oxyalkylene group is more than 0.3 mol %, the following problems occur. For a highly hydrophilic oxyalkylene group such as an oxyethylene group, removal of monomer components from vinyl polymer particles obtained becomes difficult and a plasticizer absorbency of vinyl polymer particles obtained is reduced. For a highly hydrophobic oxyalkylene group such as oxypropylene group and an oxybutylene group, suspension polymerization of vinyl compounds is unstable, so that vinyl polymer particles obtained by suspension polymerization are coarse and particles with a uniform particle size cannot be obtained.

Examples of an unsaturated monomer having an oxyalkylene group include polyoxyalkylene(meth)acrylates such as polyoxyethylene(meth)acrylate and polyoxypropylene(meth)acrylate; N-polyoxyalkylene(meth)acrylamides such as polyoxyethylene(meth)acrylic acid amide, polyoxypropylene(meth)acrylic acid amide and polyoxyethylene(1-(meth)acrylamide-1,1-dimethylpropyl) ester; polyoxyalkylene (meth)allyl ethers such as polyoxyethylene (meth)allyl ether and polyoxypropylene (meth)allyl ether; and polyoxyalkylene vinyl ethers such as polyoxyethylene vinyl ether and polyoxypropylene vinyl ether.

Among unsaturated monomers having an oxyalkylene group as described above, polyoxyalkylene (meth)allyl ether is typically used. Furthermore, polyoxyalkyleneallylamines such as polyoxyethyleneallylamine and polyoxypropyleneallylamine and polyoxyalkylenevinylamines such as polyoxyethylenevinylamine and polyoxypropylenevinylamine can be used. An average polymerization degree of oxyalkylene groups in a polyoxyalkylene group is preferably 2 to 100.

A content S' of monomer units having an oxyalkylene group in PVA(A) can be determined by $^1$H-NMR. For example, for PVA(A) into which oxyalkylene groups are introduced using polyoxyethylene allyl ether, first, a polyoxyalkylene-modified vinyl ester polymer is thoroughly purified by reprecipitation using a mixed solvent of n-hexane/acetone three times or more, dried at 50° C. under a reduced pressure for 2 days to give an analysis sample of a polyoxyalkylene-modified vinyl ester polymer. Next, the sample is dissolved in $CDCl_3$ and analyzed by $^1$H-NMR spectrometry at room temperature. From an area of peak γ derived from a proton in a main methine chain in the above vinyl ester monomer unit (4.7 to 5.2 ppm) and an area of peak δ derived from a proton in a methylene group in an oxyethylene unit (3.4 to 3.7 ppm), the amount of modified polyoxyalkylene groups can be calculated using Equation (3). A characteristic peak to be peak δ, the number of corresponding hydrogens and a unit repeating number (n) vary depending on an unsaturated monomer used. Therefore, a proper equation adapted to the unsaturated monomer used is used as appropriate.

$$\text{Content } S'(\text{mol \%}) = \{(\text{area of peak } \delta/4n)/(\text{area of peak } \gamma) + (\text{area of peak } \delta/4n)\} \times 100 \quad (3)$$

A saponification degree of a PVA having oxyalkylene groups can be determined from a ratio of hydroxyl groups to residual acetic acid group by $^1$H-NMR or by a method in accordance with JIS K6726. However, for a PVA produced by saponifying a vinyl ester polymer synthesized by co-polymerization using an unsaturated monomer having an oxyalkylene group, repeating units of the PVA contains, in addition to the repeating units of the vinyl ester monomer and the repeating units of vinyl alcohol, the repeating units of the unsaturated monomer containing an oxyalkylene group. Therefore, when a saponification degree of a PVA having an oxyalkylene group is determined in accordance with JIS K6726, in the term of an average molecular weight in the equation for determining a saponification degree as described in JIS K6726, an average molecular weight adding the co-polymerized unsaturated monomer units was used for calculation. Here, a saponification degree determined by the method is substantially equal to that determined by $^1$H-NMR.

A block character of the residual vinyl ester groups in PVA(A) is preferably 0.6 or less, more preferably 0.5 or less. If a block character is more than 0.6, removal of monomer components from vinyl polymer particles may become difficult and a plasticizer absorbency of vinyl polymer particles obtained may be reduced.

A block character described above is a value representing distribution of the residual ester groups and hydroxyl groups formed by saponification of ester groups, having a value of 0 to 2. "0" indicates that ester groups or hydroxyl groups are distributed completely as blocks. As the value increases, alternation increases. Then, "1" indicates that ester groups and hydroxyl groups are present completely at random, and "2" indicates that ester groups and hydroxyl groups are present completely alternatively.

The block character described above can be adjusted by the type of a vinyl ester monomer, the saponification conditions such as a catalyst and a solvent, heat treatment after the saponification and the like.

In the present invention, there are no particular restrictions to a method for manufacturing PVA(A), and preferred is a process where vinyl ester monomers are polymerized using the chain transfer agent described above such as a thiol and the resulting vinyl ester polymer is saponified. Examples of a vinyl ester used herein include vinyl formate, vinyl acetate, vinyl propionate, vinyl butyrate, vinyl isobutyrate, vinyl pivalate, vinyl versate, vinyl caproate, vinyl caprylate, vinyl laurate, vinyl palmitate, vinyl stearate, vinyl oleate and vinyl benzoate. Among these, vinyl acetate is most preferable.

In the synthesis of PVA(A), co-polymerization involving another monomer can be conducted without departing from the scope of the present invention. Examples of a monomer which can be used include α-olefins such as ethylene, propylene, n-butene and isobutylene; acrylic acid and its salts; acrylamide; acrylamide derivatives such as N-methylacrylamide, N-ethylacrylamide, N,N-dimethylacrylamide, diacetone acrylamide, acrylamidepropanesulfonic acid and its salts, acrylamidepropyldimethylamine and its salts or quaternary salts, and N-methylolacrylamide and its derivatives; methacrylamide; methacrylamide derivatives such as N-methylmethacrylamide, N-ethylmethacrylamide, methacrylamidepropanesulfonic acid and its salts, methacrylamidepropyldimethylamine and its salts or quaternary salts, N-methylolmethacrylamide and its derivatives; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, stearyl vinyl ether and 2,3-diacetoxy-1-vinyloxypropane; nitriles such as acrylonitrile and methacrylonitrile; vinyl halides such as vinyl chloride and vinyl fluoride; vinylidene halides such as vinylidene chloride and vinylidene fluoride; allyl compounds such as allyl acetate, 2,3-diacetoxy-1-allyloxypropane and allyl chloride; unsaturated carboxylic acids and their salts or esters such as maleic acid, itaconic acid and fumaric acid; vinylsilyl compounds such as vinyltrimethoxysilane; and isopropenyl acetate. The amount of co-polymerization of another monomer as described above is generally 10 mol % or less.

In the synthesis of PVA(A), a temperature during polymerization of vinyl ester monomers in the presence of a chain transfer agent is preferably, but not limited to, 0° C. or higher and 200° C. or lower, more preferably 30° C. or higher and 140° C. or lower. A polymerization temperature lower than 0° C. is unfavorable because a polymerization rate is inadequate. If a polymerization temperature is higher than 200° C., a desired polymer may not be obtained. A temperature during conducting polymerization is controlled to 0° C. or higher and 200° C. or lower, for example, by controlling a polymerization rate, by making a balance between heat generated by the polymerization and heat dissipation from the surface of a reactor, and by controlling it by an external jacket with a proper heat medium. In the light of safety, the latter method is preferable.

The polymerization described above can be conducted by any polymerization style such as batch polymerization, semi-batch polymerization, continuous polymerization and semi-continuous polymerization. The polymerization method can be any known method such as bulk polymerization, solution polymerization, suspension polymerization and emulsion polymerization. Among these, bulk polymerization or solution polymerization in which polymerization is conducted in a neat system or in the presence of an alcoholic solvent is suitably employed, and for the purpose of producing a polymer with a high polymerization degree, emulsion polymerization is employed. Examples of the alcoholic solvent which is used in bulk polymerization or solution polymerization can include, but not limited to, methanol, ethanol and n-propanol. These solvents can be used in combination of two or more.

An initiator used for the polymerization can be appropriately selected from known azo initiators, peroxide initiators and redox initiators depending on a polymerization method. Examples of an azo initiator include 2,2'-azobisisobutyronitrile, 2,2'-azobis(2,4-dimethylvaleronitrile) and 2,2'-azobis(4-methoxy-2,4-dimethylvaleronitrile); examples of a peroxide initiator include percarbonates such as diisopropyl peroxydicarbonate, di-2-ethylhexyl peroxydicarbonate and diethoxyethyl peroxydicarbonate; perester compounds such as t-butyl peroxyneodecanate, α-cumyl peroxyneodecanate and t-butyl peroxydecanate; acetylcyclohexylsulfonyl peroxide; and 2,4,4-trimethylpentyl-2-peroxyphenoxy acetate. Furthermore, the above initiator can be combined with, for example, potassium persulfate, ammonium persulfate or hydrogen peroxide, to be an initiator. Furthermore, a redox initiator can be a combination of the above peroxide with a reducing agent such as sodium bisulfite, sodium bicarbonate, tartaric acid, L-ascorbic acid and Rongalite.

When the polymerization is conducted at a high temperature, PVA may be stained due to decomposition of a vinyl ester monomer. Thus, in such a case, it is allowed to add an antioxidizing agent such as tartaric acid to the polymerization system in an amount of about 1 ppm or more and 100 ppm or less based on the mass of a vinyl ester monomer for preventing staining.

For the purpose of adjusting a polymerization degree of a vinyl ester polymer obtained in the polymerization, the polymerization can be conducted in the presence of another chain transfer agent without departing from the scope of the present invention. Examples of a chain transfer agent include aldehydes such as acetaldehyde and propionaldehyde; ketones such as acetone and methyl ethyl ketone; mercaptans such as 2-hydroxyethane thiol; halogenated hydrocarbons such as trichloroethylene and perchloroethylene; and phosphinates such as sodium phosphinate monohydrate. Among these, aldehydes and ketones are suitably used. The amount of the chain transfer agent can be determined, depending on a chain transfer constant of a chain transfer agent added and a polymerization degree of the desired vinyl ester polymer. In general, it is desirably 0.1% by mass or more and 10% by mass or less based on the vinyl ester monomers.

There are no particular restrictions to a stirring blade used in the polymerization, and any type of stirring blade can be used, including anchor type, paddle type and Maxblend type stirring blades. In particular, a Maxblend type stirring blade can improve a stirring efficiency so that a ratio of a weight average molecular weight (Mw) to a number average molecular weight (Mn) (Mw/Mn) of a vinyl ester polymer obtained can be reduced. In other words, the blade is preferable because it can provide a vinyl ester polymer with a narrow molecular weight distribution and thus can improve performance of a dispersion stabilizer for suspension polymerization of the present invention.

For saponification of a vinyl ester polymer, well-known alcoholysis or hydrolysis using a basic catalyst such as sodium hydroxide, potassium hydroxide and sodium methoxide or an acidic catalyst such as p-toluenesulfonic acid, hydrochloric acid, sulfonic acid and nitric acid can be employed. Examples of a solvent which can be used in such a reaction include alcohols such as methanol and ethanol; esters such as methyl acetate and ethyl acetate; ketones such as acetone and methyl ethyl ketone; and aromatic hydrocarbons such as benzene and toluene, which can be used alone or in combination of two or more. Particularly, it is convenient and preferable that the saponification is effected using methanol or a mixed solution of methanol/methyl acetate as a solvent and sodium hydroxide as a catalyst. A concentration of the vinyl ester polymer in an alcohol can be selected within the range of, but not limited to, 10 to 80% by weight. The amount of an alkali or acid is adjusted, taking a target saponification degree into consideration, and is preferably 1 to 100 mmol equivalent based on the vinyl ester polymer in the light of preventing staining of the PVA polymer and reducing the amount of sodium acetate. In the saponification using an alkali, when a functional group introduced in the vinyl ester polymer is an alkali-consuming group such as an acid group, the saponification can be conducted with using a more amount of the alkali than the above range by the amount consumed. A saponification temperature is, but not limited to, 10° C. to 70° C., preferably 30° C. to 40° C. When the saponification is conducted using an acid, a reaction rate may be lower than that with an alkali, and therefore, the saponification can be conducted at a higher temperature than that with an alkali. A reaction time is, but not limited to, about 30 min to 5 hours.

[PVA(B)]

Preferably, a dispersion stabilizer for suspension polymerization of the present invention further contains, in addition to PVA(A) described above, PVA(B) having a viscosity-average polymerization degree of 600 or more and a saponification degree of 65 mol % or more. By further adding PVA(B) having a higher saponification degree and a higher viscosity-average polymerization degree than PVA (A), polymerization stability is improved, resulting in inhibition of formation of coarse particles.

A saponification degree of PVA(B) used in the present invention is 65 mol % or more, preferably 65 mol % or more and 95 mol % or less, more preferably 68 mol % or more and 90 mol % or less. If a saponification degree of PVA(B) is less than 65 mol %, water solubility of PVA(B) may be reduced, leading to deterioration in handleability, and further making polymerization unstable so that vinyl polymer particles obtained become coarse. A saponification degree of PVA(B) is a value determined in accordance with JIS K6726.

A viscosity-average polymerization degree of PVA(B) is 600 or more, preferably 600 or more and 8000 or less, more preferably 600 or more and 3500 or less. If a viscosity-average polymerization degree of PVA(B) is less than 600, polymerization stability may be reduced in suspension polymerization of vinyl compounds. A viscosity-average polymerization degree of PVA(B) can be determined as described above for PVA(A) or in accordance with JIS K6726.

PVA(B) can consist of one compound or a combination of two or more compounds having different properties.

The vinyl alcohol polymer (A) and the vinyl alcohol polymer (B) are used in combination preferably in a mass ratio of [vinyl alcohol polymer (A)]/[vinyl alcohol polymer (B)]=10/90 to 55/45, more preferably in a mass ratio of 15/85 to 50/50. If the amount of PVA(A) is reduced to a ratio of less than 10/90, performance of a dispersion stabilizer may be reduced; for example, removal of monomer components from vinyl polymer particles obtained by suspension polymerization of vinyl compounds becomes difficult, and/or a plasticizer absorbency of vinyl polymer particles obtained is reduced. If the amount of PVA(A) is increased to a ratio of more than 55/45, there may occur problems; for example, suspension polymerization of vinyl compounds is unstable so that the suspension polymerization gives coarse vinyl polymer particles and a uniform particle size cannot be achieved.

[Other Components]

A dispersion stabilizer for suspension polymerization of the present invention can contain other additives without departing from the scope of the present invention. Examples of such additives include a polymerization modifier such as aldehydes, halogenated hydrocarbons and mercaptans; a polymerization inhibitor such as phenol compounds, sulfur-containing compounds and N-oxides; a pH adjuster; a cross-linker; a preservative; a mildew-proofing agent; an anti-blocking agent; a defoamer; and a compatibilizing agent.

[Utilities]

A dispersion stabilizer for suspension polymerization of the present invention is used for suspension polymerization of vinyl compounds. Examples of such vinyl compounds include vinyl halides such as vinyl chloride; vinyl esters such as vinyl acetate and vinyl propionate; acrylic acid, methacrylic acid and their esters and salts; maleic acid, fumaric acid and their esters and anhydrides; styrene, acrylonitrile, vinylidene chloride and vinyl ethers. Among these, a dispersion stabilizer for suspension polymerization of the present invention is used particularly suitably in suspension polymerization of vinyl chloride alone or in combination with a monomer capable of being co-polymerized with vinyl chloride. Examples of a monomer capable of being co-polymerized with vinyl chloride include vinyl esters such as vinyl acetate and vinyl propionate; (meth)acrylic acid esters such as methyl (meth)acrylate and (meth)acrylate ethyl; α-olefins such as ethylene and propylene; unsaturated dicarboxylic acids such as maleic anhydride and itaconic acid; acrylonitrile, styrene, vinylidene chloride and vinyl ethers.

In suspension polymerization of vinyl compounds, an oil-soluble or water-soluble polymerization initiator which is conventionally used in polymerization such as vinyl chloride monomer, can be used. Examples of an oil-soluble polymerization initiator include percarbonate compounds such as diisopropyl peroxydicarbonate, di-2-ethylhexyl peroxydicarbonate and diethoxyethyl peroxydicarbonate; perester compounds such as t-butyl peroxyneodecanate, t-butyl peroxypivalate, t-hexyl peroxypivalate and α-cumyl peroxyneodecanate; peroxides such as acetyl cyclohexylsulfonyl peroxide, 2,4,4-trimethylpentyl-2-peroxyphenoxy acetate, 3,5,5-trimethylhexanoyl peroxide and lauroyl peroxide; and azo compounds such as azobis-2,4-dimethylvaleronitrile and azobis(4-2,4-dimethylvaleronitrile). Examples of a water-soluble polymerization initiator include potassium persulfate, ammonium persulfate, hydrogen peroxide and cumene hydroperoxide. These oil-soluble or water-soluble polymerization initiators can be used alone or in combination of two or more.

There are no particular restrictions to a polymerization temperature during suspension polymerization of vinyl compounds, and it can be, of course, as low as about 20° C., or can be controlled to an elevated temperature higher than 90° C. Furthermore, it is also a preferable embodiment that a polymerization reactor equipped with a reflux condenser is used for improving a heat removal efficiency of the polymerization reaction system.

When a vinyl resin is produced using a dispersion stabilizer for suspension polymerization of the present invention, it is remarkably effective for removing monomer components from the vinyl resin, irrespective of a polymerization temperature. A dispersion stabilizer for suspension polymerization of the present invention is more effective in suspension polymerization at a polymerization temperature of 60° C. or higher where removal of remaining monomer components is difficult, than suspension polymerization at a polymerization temperature lower than 60° C. where removal of remaining monomer components in the vinyl resin can be relatively easy.

A dispersion stabilizer for suspension polymerization of the present invention can be used alone or in combination with a water-soluble cellulose ether such as methylcellulose, hydroxyethylcellulose, hydroxypropylcellulose and hydroxypropylmethylcellulose; a water-soluble polymer such as gelatin; an oil-soluble emulsifier such as sorbitan monolaurate, sorbitan trioleate, glycerin tristearate and ethylene oxide-propylene oxide block copolymer; and/or a water-soluble emulsifier such as polyoxyethylene sorbitane monolaurate, polyoxyethylene glycerin oleate and sodium laurate, which are commonly used in suspension polymerization of vinyl compounds in an aqueous medium. The amount of these is preferably, but not limited to, 0.01 parts by mass or more and 1.0 parts by mass or less per 100 parts by mass of vinyl compounds.

There are no particular restrictions to the manner of charging PVA(A) and PVA(B) in a polymerization tank in suspension polymerization of vinyl compounds, and PVA (A) and PVA(B) can be charged separately or as a mixture. Alternatively, only PVA(A) can be charged.

When PVA(A) and PVA(B) are charged in a polymerization tank, these can be charged as solids. However, in the light of operatability, PVA(A) and PVA(B) are preferably charged as an aqueous solution or dispersion. Here, PVA(B) has a relatively higher saponification degree and is highly water-soluble, and therefore, PVA(B) is preferably charged as an aqueous solution. PVA(A) is also desirably charged as an aqueous solution in the light of handleability. However, PVA(A) has a low saponification degree and is poorly soluble in water due to a terminal alkyl group. Therefore, it is difficult to dissolve PVA(A) in water, and when it is dispersed in water, it is difficult to obtain a uniform and stable aqueous dispersion.

It is known that for improving water solubility of PVA with poor hydrophilicity such as PVA(A), a hydrophilic group such as an oxyalkylene group is introduced in PVA, to improve water solubility and water dispersibility. However, in PVA(A) of this invention, a content of oxyalkylene groups is 0.3 mol % or less. Although it causes decrease in water solubility of PVA(A), it has been found that it is effective for increasing a plasticizer absorbency and facilitating removal of monomer components. Particularly, it has been found that it is prominently effective when polymerization is conducted at a temperature of 60° C. or higher.

Since PVA(A) is less soluble in water as described above, precipitation may occur in an aqueous solution or dispersion of PVA(A). It is, therefore, preferable that a solution or dispersion containing PVA(A) and methanol or compound (C) represented by general formula (I) is preliminarily prepared before charging it in a reactor. Thus, a stable solution or dispersion can be obtained. Here, a content of methanol or compound (C) represented by general formula (I) in the solution is preferably 1 to 50% by mass, and preferably an aqueous solution containing methanol or compound (C) represented by general formula (I) is used as a solvent or dispersion medium. A content of methanol or compound (C) represented by general formula (I) is more suitably 2% by mass or more, further suitably 5% by mass or more. A content of methanol or compound (C) represented by general formula (I) is more suitably 40% by mass or less.

[Chemical Formula 2]

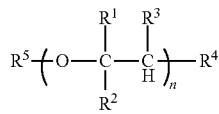

$$R^5 \left( O - \underset{R^2}{\underset{|}{\overset{R^1}{\overset{|}{C}}}} - \underset{H}{\underset{|}{\overset{R^3}{\overset{|}{C}}}} \right)_n R^4 \quad (I)$$

wherein $R^1$, $R^2$ and $R^5$ represent, independently of each other, a hydrogen atom or an alkyl group having 1 to 6 carbon atoms; $R^3$ represents a hydrogen atom, an alkyl group having 1 to 6 carbon atoms or a hydroxyalkyl group having 1 to 6 carbon atoms; $R^4$ represents a hydrogen atom, a hydroxyl group or an alkoxyl group having 1 to 6 carbon atoms; n represents an integer of 1 to 6.

Examples of an alkyl group having 1 to 6 carbon atoms represented by $R^1$, $R^2$, $R^3$ and $R^5$ in compound (C) represented by general formula (I) which is used in the present invention, include —CH$_3$, —CH$_2$CH$_3$, —CH$_2$CH$_2$CH$_3$, —CH(CH$_3$)$_2$, —CH$_2$CH$_2$CH$_2$CH$_3$, —C(CH$_3$)$_2$, —CH$_2$CH(CH$_3$)$_2$, —CH$_2$CH$_2$CH$_2$CH$_2$CH$_3$, —CH$_2$C(CH$_3$)$_3$, —CH$_2$CH$_2$CH$_2$CH$_2$CH$_2$CH$_3$ and —CH$_2$CH$_2$CH$_2$CH(CH$_3$)$_2$; examples of a hydroxyalkyl group having 1 to 6 carbon atoms represented by $R^3$ include —CH$_2$OH, —CH$_2$CH$_2$OH, —CH$_2$CH$_2$CH$_2$OH, —CH$_2$CH(CH$_3$)CH$_2$OH, —CH$_2$CH$_2$CH(CH$_3$)OH and —CH(CH$_3$)CH$_2$CH$_2$OH; and examples of an alkoxyl group having 1 to 6 carbon atoms represented by $R^4$ include —OCH$_3$, —OCH$_2$CH$_3$, —OCH$_2$CH$_2$CH$_3$, —OCH$_2$CH$_2$CH$_2$CH$_3$, —OC(CH$_3$)$_3$, —OCH$_2$CH$_2$CH$_2$CH$_2$CH$_3$ and —OCH$_2$CH$_2$CH$_2$CH$_2$CH$_2$CH$_3$.

Compound (C) represented by general formula (I) which is suitably used in the present invention can be, for example, an alcohol in which n is 1; and $R^4$ and $R^5$ are a hydrogen atom. Examples of such an alcohol include ethanol, 1-propanol and 2-propanol.

Compound (C) can be a glycol compound represented by general formula (I) wherein $R^1$ is a hydrogen atom or an alkyl group having 1 to 6 carbon atoms; $R^2$ is a hydrogen atom or an alkyl group having 1 to 6 carbon atoms; $R^3$ is a hydrogen atom or a hydroxyalkyl group having 1 to 6 carbon atoms; $R^4$ is a hydrogen atom or a hydroxyl group; and $R^5$ is a hydrogen atom. Examples of such a glycol compound include ethylene glycol, diethylene glycol, triethylene glycol, tetraethylene glycol, polyethylene glycol, propylene glycol, dipropylene glycol, glycerin, 1,3-propanediol, 1,4-butanediol, 1,6-hexanediol, 3-methyl-1,3-butanediol and 3-methyl-1,5-pentanediol. Compounds (C) represented by general formula (I) can be used alone or in combination of two or more.

Compound (C) can be a glycol ether compound represented by general formula (I) wherein $R^1$ is a hydrogen atom or an alkyl group having 1 to 6 carbon atoms; $R^2$ is a hydrogen atom or an alkyl group having 1 to 6 carbon atoms; $R^3$ is a hydrogen atom or a hydroxyalkyl group having 1 to 6 carbon atoms; $R^4$ is a hydrogen atom, a hydroxyl group or an alkoxyl group having 1 to 6 carbon atoms; and $R^5$ is an alkyl group having 1 to 6 carbon atoms. Examples of such a glycol ether compound include ethylene glycol monomethyl ether, ethylene glycol dimethyl ether, ethylene glycol monoethyl ether, ethylene glycol diethyl ether, ethylene glycol monopropyl ether, ethylene glycol dipropyl ether, ethylene glycol monobutyl ether, ethylene glycol dibutyl ether, propylene glycol monomethyl ether, propylene glycoldimethyl ether, propylene glycol monoethyl ether, propylene glycol diethyl ether, propylene glycol monopropyl ether, propylene glycol dipropyl ether, propylene glycol monobutyl ether and propylene glycol dibutyl ether. Further examples include condensates of ethylene glycol such as diethylene glycol monomethyl ether, diethylene glycol dimethyl ether, diethylene glycol monoethyl ether, diethylene glycol diethyl ether, diethylene glycol monobutyl ether, diethylene glycol dihexyl ether, triethylene glycol monomethyl ether, tetraethylene glycol dimethyl ether, pentaethylene glycol diethyl ether and hexaethylene glycol dipropyl ether. Further examples include condensates of propylene glycol such as dipropylene glycol monomethyl ether, dipropylene glycol dimethyl ether, tripropylene glycol dimethyl ether, tetrapropylene glycol dimethyl ether and hexapropylene glycol dimethyl ether. Furthermore, 3-methoxy-1-butanol and 3-methoxy-3-methyl-1-butanol can be mentioned.

Suspension polymerization of vinyl compounds as described above in the presence of a dispersion stabilizer of the present invention can provide vinyl polymer particles in which the absorbency of a plasticizer is high, resulting in easy processing and formation of coarse particles is little, and the remaining monomer components can be easily removed. The particles thus produced appropriately in combination with a plasticizer and the like can be used for various molded articles.

EXAMPLES

The present invention will be further detailed with reference to Examples. In Examples and Comparative Examples below, "part (s)" and "%" denote, unless otherwise stated, part(s) by mass and % by mass, respectively.

PVA(A)s produced by the production examples below were evaluated by the following methods.
[Viscosity-Average Polymerization Degree of PVA]
A viscosity-average polymerization degree of PVA was calculated using Nakajima's equation (Akio Nakajima, "Kobunshi-Kagaku" (Polymer Science) 6 (1949)) from a limiting viscosity determined for an acetone solution of the vinyl ester polymer produced by substantially completely saponifying a PVA polymer followed by acetylization.
[Saponification Degree of PVA]
A saponification degree of PVA can be determined by measuring a ratio of hydroxyl groups to residual acetic acid groups by means of $^1$H-NMR or as described in JIS K6726. In this example, a saponification degree was determined as described in JIS K6726. However, in PVA produced by saponifying a vinyl ester polymer synthesized by co-polymerization using an unsaturated monomer having an oxyalkylene group, repeating units in PVA contain, in addition to repeating units of a vinyl ester monomer and repeating units of vinyl alcohol, repeating units of an unsaturated monomer having an oxyalkylene group. Therefore, in the equation calculating a saponification degree described in JIS K6726, a saponification degree was calculated with correction using an average molecular weight adding the unsaturated monomer units co-polymerized. A saponification degree determined by the above method is substantially equal to that determined by $^1$H-NMR.
[Block Character of PVA]
A block character of the residual vinyl ester groups in PVA was determined as follows; the PVA was subjected to $^{13}$C-NMR spectrometry in a mixed solvent of deuterated water and deuterated methanol at a measurement temperature of 70° C. with a cumulative number of 18,000 to give integrated values of a methylene carbon peak sandwiched between a residual ester group and a hydroxyl group, a methylene carbon peak sandwiched between residual ester groups and a methylene carbon peak sandwiched between hydroxyl groups, from which a block character was determined. Measuring methods and calculation methods are described in "Poval" (Kobunshi Kanko Kai, published 1984, pp. 246 to 249) and Macromolecules, 10, 532 (1977).

Production Example 1 (Production of PVA(A1))

In a polymerization can were charged 1174 parts of vinyl acetate (hereinafter, abbreviated as "VAc"), 626 parts of methanol and 0.43 parts of n-dodecanethiol (hereinafter, abbreviated as "DDM"). After nitrogen substitution, the mixture was heated to its boiling point and then 0.03% of azobisisobutyronitrile based on VAc and 10 parts of methanol were added. Immediately, addition of a solution of DDM in methanol (concentration: 5 wt %) at room temperature to the polymerization can was started, and polymerization was conducted while addition of the DDM/methanol solution was continued to keep a DDM concentration in the polymerization can constant based on VAc. Once a polymerization rate became 40%, polymerization was stopped. While adding methanol, remaining VAc together with methanol was expelled from the system under a reduced pressure, to give a solution of vinyl acetate polymer (hereinafter, abbreviated as "PVAc") (concentration: 63%). Next, the vinyl acetate polymer at a concentration of 30% in a methanol solvent was saponified for one hour at a temperature of 40° C. with a water content 1% of the saponification solution using sodium hydroxide as a saponification catalyst at a molar ratio of 0.002 based on PVAc, neutralized with water and then dried to give PVA(A1) with a viscosity-average polymerization degree of 270, a saponification degree of 48 mol %, a block character of 0.447 and "S×P/1.880" in Formula (1) of 75.

Production Examples 2 to 9, 11, 15 to 19, 21
(Production of PVAs (A2 to 9, 11, 15 to 19, 21))

PVAs (A2 to 9, 11, 15 to 19, 21) in Table 2 were produced as described in Production Example 1, changing the polymerization conditions such as the charge amounts of vinyl acetate and methanol, the type, the amount and the addition concentration of a chain transfer agent having an alkyl group used in polymerization and the amount of an initiator, and the saponification conditions such as a saponification catalyst, its amount, its concentration, its water content and a temperature. The production conditions are shown in Table 1, and the types of chain transfer agents used and the saponification conditions are shown in Tables 3 and 5.

Production Example 10 (Production of PVA(A10))

PVA(A1) produced was heated at 130° C. under nitrogen atmosphere for 6 hours to give PVA(A10). The physical properties of PVA(A10) produced are shown in Table 2.

Production Examples 12 to 14 (Production of PVAs (A12 to 14))

PVAs (A12 to 14) shown in Table 2 were produced as described in Production Example 1, except that the polymerization conditions such as the charge amounts of vinyl acetate and methanol, the amount and the addition concentration of a chain transfer agent having an alkyl group used in polymerization and the amount of an initiator, and the saponification conditions such as a saponification catalyst were changed, and an unsaturated monomer to be co-polymerized before initiating polymerization in an amount shown in Table 1 was charged in a polymerization can. Contents of monomer units having an oxyalkylene group in these PVAs were 0.3 mol % for PVA(A12), 1.2 mol % for PVA(A13), and 2.4 mol % for PVA(A14). The production conditions are shown in Table 1 and unsaturated monomers to be co-polymerized are shown in Table 4.

Production Example 20 (Production of PVA(A20))

n-Docosanethiol used as a chain transfer agent was insoluble in methanol. Therefore, it could not be added to a polymerization can as a methanol solution at room temperature, so that PVA was not produced.

Production Example 22 (Production of PVA(A22))

PVA(A22) shown in Table 2 was produced as described in Production Example 1, except that a chain transfer agent having an alkyl group was not used and the polymerization conditions such as the charge amounts of vinyl acetate and methanol and the amount of an initiator were changed. The production conditions were shown in Table 1.

TABLE 1

| | | Charge | | | | | | | | Saponification conditions | |
|---|---|---|---|---|---|---|---|---|---|---|---|
| | | | | | | Unsaturated monomer to be co-polymerization | | | | | |
| | | Vinyl acetate | Methanol | Chain transfer agent having an alkyl group | | | | Initiator (wt %/ VAc) | Polymerization rate (%) | Catalyst based on PVAc (molar ratio) | Saponification conditions | Post-treatment Heating |
| | PVA(A) | (part(s)) | (part(s)) | Type | Initial charge (part(s)) | Addition (part(s)) | Type | Initial charge (part(s)) | | | | |
| Production Example 1 | PVA(A1) | 1174 | 626 | A | 0.43 | 6.24 | — | — | 0.03 | 40 | 0.002 | A | x |
| Production Example 2 | PVA(A2) | 1174 | 626 | A | 0.43 | 6.24 | — | — | 0.03 | 40 | 0.0026 | A | x |
| Production Example 3 | PVA(A3) | 1174 | 626 | A | 0.43 | 6.24 | — | — | 0.03 | 40 | 0.0016 | A | x |
| Production Example 4 | PVA(A4) | 1170 | 630 | B | 0.31 | 4.50 | — | — | 0.023 | 40 | 0.002 | A | x |
| Production Example 5 | PVA(A5) | 1172 | 628 | C | 0.61 | 8.82 | — | — | 0.023 | 40 | 0.0024 | A | x |

TABLE 1-continued

| | | Charge | | | | | | | | Saponification conditions | | |
|---|---|---|---|---|---|---|---|---|---|---|---|---|
| | | | | | | Unsaturated monomer to be co-polymerization | | Initiator (wt %/ VAc) | Polymerization rate (%) | Catalyst based on PVAc (molar ratio) | Saponification conditions | Post-treatment Heating |
| | | Vinyl acetate (part(s)) | Methanol (part(s)) | Chain transfer agent having an alkyl group | | | | | | | | |
| | PVA(A) | | | Type | Initial charge (part(s)) | Addition (part(s)) | Type | Initial charge (part(s)) | | | | | |
| Production Example 6 | PVA(A6) | 1548 | 252 | A | 0.25 | 1.96 | — | — | 0.005 | 21 | 0.0017 | A | x |
| Production Example 7 | PVA(A7) | 1494 | 306 | A | 0.64 | 3.71 | — | — | 0.004 | 15 | 0.002 | A | x |
| Production Example 8 | PVA(A8) | 900 | 900 | A | 0.28 | 4.60 | — | — | 0.1 | 50 | 0.0019 | A | x |
| Production Example 9 | PVA(A9) | 1174 | 626 | A | 0.43 | 6.24 | — | — | 0.03 | 40 | 0.002 | A | x |
| Production Example 10 | PVA(A10) | 1174 | 626 | A | 0.43 | 6.24 | — | — | 0.03 | 40 | 0.0019 | A | ○ |
| Production Example 11 | PVA(A11) | 1174 | 626 | A | 0.43 | 6.24 | — | — | 0.03 | 40 | 0.016 | B | x |
| Production Example 12 | PVA(A12) | 960 | 240 | A | 0.37 | 9.57 | A | 50 | 0.25 | 80 | 0.0045 | A | x |
| Production Example 13 | PVA(A13) | 960 | 240 | A | 0.33 | 8.18 | A | 203 | 0.25 | 80 | 0.005 | A | x |
| Production Example 14 | PVA(A14) | 924 | 276 | A | 0.31 | 7.56 | B | 350 | 0.25 | 80 | 0.0044 | A | x |
| Production Example 15 | PVA(A15) | 1174 | 626 | A | 0.43 | 6.24 | — | — | 0.03 | 40 | 0.0013 | A | x |
| Production Example 16 | PVA(A16) | 1174 | 626 | A | 0.43 | 6.24 | — | — | 0.03 | 40 | 0.0034 | A | x |
| Production Example 17 | PVA(A17) | 707 | 1093 | A | 0.65 | 11.76 | — | — | 0.095 | 50 | 0.0021 | A | x |
| Production Example 18 | PVA(A18) | 1566 | 234 | A | 0.16 | 1.18 | — | — | 0.004 | 20 | 0.002 | A | x |
| Production Example 19 | PVA(A19) | 1170 | 630 | D | 0.16 | 2.35 | — | — | 0.023 | 40 | 0.002 | A | x |
| Production Example 20 | PVA(A20) | — | — | E | — | — | — | — | — | — | — | A | x |
| Production Example 21 | PVA(A21) | 720 | 1080 | A | 0.21 | 3.19 | — | — | 0.1 | 60 | 0.0021 | A | x |
| Production Example 22 | PVA(A22) | 396 | 1404 | — | — | — | — | — | 0.4 | 55 | 0.002 | A | x |

TABLE 2

| | | Physical properties of PVA(A) | | | |
|---|---|---|---|---|---|
| | PVA(A) | Viscosity-average polymerization degree | Saponification degree (mol %) | Block character | Value of Formula (1) |
| Production Example 1 | PVA(A1) | 270 | 48 | 0.447 | 75 |
| Production Example 2 | PVA(A2) | 270 | 57 | 0.445 | 75 |
| Production Example 3 | PVA(A3) | 270 | 39 | 0.434 | 75 |
| Production Example 4 | PVA(A4) | 260 | 46 | 0.448 | 72 |
| Production Example 5 | PVA(A5) | 260 | 53 | 0.438 | 72 |
| Production Example 6 | PVA(A6) | 520 | 42 | 0.447 | 70 |
| Production Example 7 | PVA(A7) | 260 | 50 | 0.449 | 89 |
| Production Example 8 | PVA(A8) | 250 | 47 | 0.459 | 57 |
| Production Example 9 | PVA(A9) | 270 | 50 | 0.379 | 75 |
| Production Example 10 | PVA(A10) | 270 | 45 | 0.522 | 75 |
| Production Example 11 | PVA(A11) | 270 | 43 | 0.725 | 75 |
| Production Example 12 | PVA(A12) | 250 | 52 | 0.457 | 69 |

TABLE 2-continued

| PVA(A) | PVA(A) | Viscosity-average polymerization degree | Saponification degree (mol %) | Block character | Value of Formula (1) |
|---|---|---|---|---|---|
| | | Physical properties of PVA(A) | | | |
| Production Example 13 | PVA(A13) | 260 | 54 | 0.479 | 68 |
| Production Example 14 | PVA(A14) | 260 | 52 | 0.480 | 67 |
| Production Example 15 | PVA(A15) | 270 | 25 | 0.477 | 75 |
| Production Example 16 | PVA(A16) | 270 | 66 | 0.460 | 75 |
| Production Example 17 | PVA(A17) | 100 | 53 | 0.450 | 77 |
| Production Example 18 | PVA(A18) | 800 | 49 | 0.427 | 66 |
| Production Example 19 | PVA(A19) | 250 | 52 | 0.438 | 75 |
| Production Example 20 | PVA(A20) | — | — | — | — |
| Production Example 21 | PVA(A21) | 270 | 53 | 0.441 | 41 |
| Production Example 22 | PVA(A22) | 250 | 50 | 0.471 | — |

TABLE 3

| Type | Chain transfer agent | Carbon number |
|---|---|---|
| A | n-Dodecanethiol | 12 |
| B | n-Octanethiol | 8 |
| C | n-Octadecanethiol | 18 |
| D | n-Propanethiol | 3 |
| E | n-Docosanethiol | 22 |

TABLE 4

| Type | Unsaturated monomer |
|---|---|
| A | Polyoxypropylene allyl ether (n = 25) |
| B | Polyoxyethylene allyl ether (n = 30) |

TABLE 5

| Type | Catalyst used | PVAc concentration Concentration (%) | Saponification system Temperature (° C.) | Saponification system Water content (%) |
|---|---|---|---|---|
| A | Sodium hydroxide | 30 | 40 | 1 |
| B | p-Toluenesulfonic acid | 30 | 65 | 0.5 |

Example 1

In a 5 liter autoclave were charged PVA(B1) with a polymerization degree of 2400 and a saponification degree of 80 mol % in an amount of 1000 ppm based on vinyl chloride monomers as 100 parts of an deionized-water solution, and PVA(A1) in an amount of 400 ppm based on vinyl chloride monomers as 100 parts of a solution (methanol:deionized water=3:22), and further deionized water in such an amount that the total amount of deionized water charged was to be 1640 parts. Next, 1.07 parts of a 70% solution of di(2-ethylhexyl) peroxydicarbonate in toluene was charged in the autoclave. Nitrogen was introduced to such an autoclave pressure of 0.2 MPa and then nitrogen introduced was purged, and the operation was repeated five times in total, to completely substitute the atmosphere with nitrogen for removing oxygen. Then, 940 parts of vinyl chloride was charged in the autoclave, and the content in the autoclave was heated to 65° C. with stirring, to initiate polymerization of vinyl chloride monomers. A pressure in the autoclave at the initiation of polymerization was 1.05 MPa. At the time that a pressure in the autoclave became 0.70 MPa about three hours after the initiation of polymerization, the polymerization was stopped. Unreacted vinyl chloride monomers were removed, and the polymerization product was collected and dried at 65° C. for 16 hours to give vinyl chloride polymer particles.

[Evaluation of Vinyl Chloride Polymer Particles]

The vinyl chloride polymer particles produced in Example 1 was evaluated for (1) an average particles size, (2) a particle size distribution, (3) a plasticizer absorbency and (4) monomer removal as described below. The evaluation results are shown in Table 6.

(1) Average Particle Size

A particle size distribution was measured by dry-sieve analysis using a metal mesh on the Tyler mesh scale, to determine an average particle size of vinyl chloride polymer particles.

(2) Particle Size Distribution

A content of JIS standard sieve 42 mesh-on was given in % by mass.
A: less than 0.5%
B: 0.5% or more and less than 1%
C: 1% or more A content of JIS standard sieve 60 mesh-on was given in % by mass.
A: less than 5%
B: 5% or more and less than 10%
C: 10% or more It is indicated that the smaller both contents of 42 mesh-on and of 60 mesh-on are, the less coarse particles are and the sharper a particle size distribution is, and thus the more stable polymerization is.

(3) Plasticizer Absorbency

A 5 mL syringe filled with 0.02 g of absorbent cotton was weighed (A g). To the syringe was added 0.5 g of vinyl chloride polymer particles, and the syringe was weighed (B g). To the syringe was added 1 g of dioctyl phthalate (DOP). After standing for 15 min, it was centrifuged at 3000 rpm for 40 min, and then was weighed (C g). Then, a plasticizer absorbency (%) was determined from the calculating formula below.

Plasticizer absorbency (%)=100×[{(C−A)/(B−A)}−1]

(4) Monomer Removability (Rate of Remaining Monomers)

A polymerization product in suspension polymerization of vinyl chloride was collected, dried at 75° C. for 1 hour and 3 hours, at which the amount of remaining monomers was measured by head-space gas chromatography, to determine a rate of the remaining monomers from the formula: (the amount of remaining monomers at 3 h/the amount of remaining monomers at 1 h)×100. A smaller value means that a more proportion of remaining monomers in vinyl chloride polymer particles was removed by drying for 2 hours from 1 hour to 3 hour time points. Therefore, this value can be an indicator of ease of removing remaining monomers, that is, monomer removability.

Examples 2 to 12

Suspension polymerization of vinyl chloride was conducted to produce vinyl chloride polymer particles as described in Example 1, except that each of PVAs (A2 to 12) was used. The evaluation results of the vinyl chloride polymer particles are shown in Table 6.

Example 13

Suspension polymerization of vinyl chloride was conducted to produce vinyl chloride polymer particles as described in Example 1, except that PVA(A1) was charged in a polymerization tank not as a solution but as a solid. The evaluation results of the vinyl chloride polymer particles are shown in Table 6.

Example 14

Suspension polymerization of vinyl chloride was conducted to produce vinyl chloride polymer particles as described in Example 1, except that PVA(B2) with a polymerization degree of 2000 and a saponification degree of 80 mol % was charged in amount of 800 ppm based on vinyl chloride monomers, PVA(A1) was charged in an amount of 200 ppm based on vinyl chloride monomers, a polymerization temperature was 57° C., and the amount of water charged was 1390 parts in total. The evaluation results of the vinyl chloride polymer particles are shown in Table 7.

Examples 15 to 22

Suspension polymerization of vinyl chloride was conducted to produce vinyl chloride polymer particles as described in Example 1, except that PVA(A1) was dissolved in a mixed solvent of compound (C) shown in Table 9 and water to prepare a 30 wt % aqueous solution, which was then charged in a 5 liter autoclave in such an amount that a concentration of PVA(A1) in the aqueous solution was to be 400 ppm based on vinyl chloride monomers as a solid ratio. The evaluation results of the vinyl chloride polymer particles are shown in Table 8.

Comparative Example 1

Suspension polymerization of vinyl chloride was conducted as described in Example 1, except that PVA(A1) was not used. The evaluation results of the vinyl chloride polymer particles are shown in Table 6. Here, the vinyl chloride polymer particles obtained were unsatisfactory in a plasticizer absorbency and monomer removability.

Comparative Example 2

Suspension polymerization of vinyl chloride was conducted as described in Example 1, substituting PVA(A13) having polyoxypropylene units for PVA(A1). The evaluation results of the vinyl chloride polymer particles are shown in Table 6. Here, the vinyl chloride polymer particles obtained were excellent in a plasticizer absorbency and monomer removability, but vinyl chloride particles were very coarse, leading to unstable polymerization.

Comparative Example 3

Suspension polymerization of vinyl chloride was conducted as described in Example 1, substituting PVA(A14) having polyoxypropylene units for PVA(A1). The evaluation results of the vinyl chloride polymer particles are shown in Table 6. Here, the vinyl chloride polymer particles obtained were unsatisfactory in a plasticizer absorbency and monomer removability.

Comparative Example 4

Suspension polymerization of vinyl chloride was conducted as described in Example 1, substituting PVA(A15) with a saponification degree of 25 mol % for PVA(A1). The evaluation results of the vinyl chloride polymer particles are shown in Table 6. Here, the vinyl chloride polymer particles obtained were unsatisfactory in a plasticizer absorbency and monomer removability.

Comparative Example 5

Suspension polymerization of vinyl chloride was conducted as described in Example 1, substituting PVA(A16) with a saponification degree of 66 mol % for PVA(A1). The evaluation results of the vinyl chloride polymer particles are shown in Table 6. Here, the vinyl chloride polymer particles obtained were unsatisfactory in a plasticizer absorbency and monomer removability.

Comparative Example 6

Suspension polymerization of vinyl chloride was conducted as described in Example 1, substituting PVA(A17) with a viscosity-average polymerization degree of 100 for PVA(A1). The evaluation results of the vinyl chloride polymer particles are shown in Table 6. Here, the vinyl chloride polymer particles obtained were excellent in a plasticizer absorbency and monomer removability, but vinyl chloride particles were very coarse, leading to unstable polymerization.

Comparative Example 7

Suspension polymerization of vinyl chloride was conducted as described in Example 1, substituting PVA(A18) with a viscosity-average polymerization degree of 800 for PVA(A1). The evaluation results of the vinyl chloride polymer particles are shown in Table 6. Here, the vinyl chloride polymer particles obtained were unsatisfactory in a plasticizer absorbency and monomer removability.

Comparative Example 8

Suspension polymerization of vinyl chloride was conducted as described in Example 1, substituting PVA(A19) produced using n-propanethiol as a chain transfer agent, for PVA(A1). The evaluation results of the vinyl chloride polymer particles are shown in Table 6. Here, the vinyl chloride polymer particles obtained were unsatisfactory in a plasticizer absorbency and monomer removability.

Comparative Example 9

Suspension polymerization of vinyl chloride was conducted as described in Example 1, substituting PVA(A21) in which a value of Formula (1) was 41, for PVA(A1). The evaluation results of the vinyl chloride polymer particles are shown in Table 6. Here, the vinyl chloride polymer particles obtained were unsatisfactory in a plasticizer absorbency and monomer removability.

Comparative Example 10

Suspension polymerization of vinyl chloride was conducted as described in Example 1, substituting unmodified PVA(A22) synthesized without using a chain transfer agent, for PVA(A1). The evaluation results of the vinyl chloride polymer particles are shown in Table 6. Here, the vinyl chloride polymer particles obtained were unsatisfactory in a plasticizer absorbency and monomer removability. Furthermore, because a chain transfer agent was not used in synthesis of PVA(A22) as shown in Table 1, a proportion of vinyl acetate to methanol was very low in comparison with PVA(A1)). Therefore, PVA(A22) is not suitable for large scale synthesis and results in very low production efficiency.

Comparative Example 11

Suspension polymerization of vinyl chloride was conducted as described in Example 14, substituting unmodified PVA(A22) synthesized without using a chain transfer agent, for PVA(A1). The evaluation results of the vinyl chloride polymer particles are shown in Table 7. Here, the vinyl chloride polymer particles obtained were unsatisfactory in a plasticizer absorbency and monomer removability. When Example 1 and 14 and Comparative Examples 10 and 11 were compared each other, PVA(A) of the present invention demonstrated prominent difference in monomer removability at a higher polymerization temperature compared to unmodified PVA(A22) synthesized without using a chain transfer agent.

TABLE 6

| | | Evaluation results of polyvinyl chloride particles | | | | |
|---|---|---|---|---|---|---|
| | | Average particle size (μm) | Particle size distribution | | Plasticizer Absorbency (%) | Proportion of the remaining monomer amount (%) |
| | PVA (A) | | 42 Mesh-on | 60 Mesh-on | | |
| Example 1 | PVA(A1) | 126.7 | A | A | 17.7 | 3.5 |
| Example 2 | PVA(A2) | 135.2 | A | A | 17.0 | 8.1 |
| Example 3 | PVA(A3) | 119.9 | A | A | 17.1 | 8.2 |
| Example 4 | PVA(A4) | 125.6 | A | A | 17.7 | 3.4 |
| Example 5 | PVA(A5) | 129.2 | A | A | 17.9 | 3.3 |
| Example 6 | PVA(A6) | 115.7 | A | A | 16.9 | 7.2 |
| Example 7 | PVA(A7) | 122.4 | A | A | 18.3 | 2.6 |
| Example 8 | PVA(A8) | 129.8 | A | A | 17.9 | 7.5 |
| Example 9 | PVA(A9) | 126.1 | A | A | 18.0 | 3.4 |
| Example 10 | PVA(A10) | 124.6 | A | A | 17.8 | 4.7 |
| Example 11 | PVA(A11) | 133.3 | A | A | 17.2 | 8.9 |
| Example 12 | PVA(A12) | 182.2 | B | B | 17.9 | 4.6 |
| Example 13 | PVA(A1) | 130.1 | A | A | 17.6 | 3.7 |
| Comparative Example 1 | — | 131.1 | B | A | 6.1 | 34.9 |
| Comparative Example 2 | PVA(A13) | 297.6 | C | C | 18.8 | 3.1 |
| Comparative Example 3 | PVA(A14) | 150.3 | A | A | 14.2 | 18.2 |
| Comparative Example 4 | PVA(A15) | 145.2 | B | A | 16.4 | 15.2 |
| Comparative Example 5 | PVA(A16) | 138.5 | A | A | 16.4 | 14.1 |
| Comparative Example 6 | PVA(A17) | 191.2 | C | C | 17.7 | 4.0 |
| Comparative Example 7 | PVA(A18) | 128.4 | B | A | 14.3 | 17.9 |
| Comparative Example 8 | PVA(A19) | 122.2 | A | A | 15.9 | 12.5 |
| Comparative Example 9 | PVA(A21) | 130.6 | A | A | 16.2 | 11.8 |
| Comparative Example 10 | PVA(A22) | 119.4 | A | A | 14.9 | 12.8 |

TABLE 7

| | PVA(A) | PVA(B) | Polymerization temperature (° C.) | Average particle size (μm) | Particle size distribution 42 Mesh-on | Particle size distribution 60 Mesh-on | Plasticizer Absorbency (%) | Proportion of the remaining monomer amount (%) |
|---|---|---|---|---|---|---|---|---|
| | | | | | Evaluation results of polyvinyl chloride particles | | | |
| Example 1 | PVA(A1) | PVA(B1) | 65 | 126.7 | A | A | 17.7 | 3.5 |
| Example 14 | PVA(A1) | PVA(B2) | 57 | 156.6 | A | A | 20.9 | 2.3 |
| Comparative Example 10 | PVA(A22) | PVA(B1) | 65 | 119.4 | A | A | 14.9 | 12.8 |
| Comparative Example 11 | PVA(A22) | PVA(B2) | 57 | 175.8 | A | A | 18.7 | 7.0 |

TABLE 8

| | PVA(A) | Compound (C) | PVA(A):Compound (C):Water | Average particle size (μm) | Particle size distribution 42 Mesh-on | Particle size distribution 60 Mesh-on | Plasticizer Absorbency (%) | Proportion of the remaining monomer amount (%) |
|---|---|---|---|---|---|---|---|---|
| | | | | | Evaluation results of polyvinyl chloride particles | | | |
| Example 15 | PVA(A1) | A | 30:10:60 | 120.7 | A | A | 17.6 | 3.7 |
| Example 16 | PVA(A1) | A | 30:3:67 | 126.2 | A | A | 17.5 | 3.7 |
| Example 17 | PVA(A1) | B | 30:10:60 | 126.1 | A | A | 17.5 | 3.6 |
| Example 18 | PVA(A1) | C | 30:10:60 | 119.3 | A | A | 17.4 | 3.7 |
| Example 19 | PVA(A1) | D | 30:10:60 | 122.8 | A | A | 17.5 | 3.7 |
| Example 20 | PVA(A1) | E | 30:10:60 | 129.9 | A | A | 17.3 | 4.0 |
| Example 21 | PVA(A1) | F | 30:10:60 | 128.2 | A | A | 17.4 | 3.9 |
| Example 22 | PVA(A1) | G | 30:10:60 | 122.4 | A | A | 17.5 | 3.9 |

TABLE 9

| Type | Compound (C) |
|---|---|
| A | 3-Methoxy-3-methyl-1-butanol |
| B | Ethanol |
| C | Ethylene glycol monobutyl ether |
| D | 3-Methyl-1,5-pentanediol |
| E | Ethylene glycol |
| F | Propylene glycol |
| G | Triethylene glycol |

As demonstrated in Examples above, when suspension polymerization of a vinyl compound was conducted using a dispersion stabilizer of the present invention for suspension polymerization of vinyl compounds comprising a vinyl alcohol polymer (A) which had a saponification degree of 30 mol % or more and less than 60 mol % and a viscosity-average polymerization degree (P) of more than 200 and less than 600, and had a terminal alkyl group having 6 to 18 carbon atoms, and in which a content of monomer units having an oxyalkylene group was 0.3 mol % or less and the relationship between the viscosity-average polymerization degree (P) and a modification rate (S) (mol %) of the alkyl group satisfied Formula (1), the polymerization was highly stable, so that formation of coarse particles was reduced and particles with a uniform particle size were produced. It allows for providing polymer particles having excellent plasticizer absorbency, particularly polymer particles which are highly effective in terms of monomer removability and in which remaining monomers can be very efficiently removed. Furthermore, in producing a vinyl resin, it allows for synthesis in a larger scale than synthesis without a chain transfer agent, with a high production efficiency. A dispersion stabilizer for suspension polymerization of the present invention is, therefore, industrially remarkably useful.

The invention claimed is:

1. A solution or dispersion, comprising:
   a dispersion stabilizer; and
   methanol or a compound (C) of formula (I)

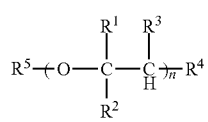

(I)

wherein $R^1$, $R^2$ and $R^5$ represent, independently of each other, a hydrogen atom or an alkyl group having 1 to 6 carbon atoms; $R^3$ represents a hydrogen atom, an alkyl group having 1 to 6 carbon atoms or a hydroxyalkyl group having 1 to 6 carbon atoms; $R^4$ represents a hydrogen atom, a hydroxyl group or an alkoxyl group having 1 to 6 carbon atoms; n represents an integer of 1 to 6, wherein a content of methanol or the compound (C) in the solution or dispersion is 1 to 50% by mass, and wherein the dispersion stabilizer comprises:
   a vinyl alcohol polymer (A) which has a saponification degree of 35 mol % or more and less than 60 mol % and a viscosity-average polymerization degree (P) of more than 200 and 400 or less, and has a terminal alkyl group having 6 to 18 carbon atoms, wherein a content of monomer units having an oxyalkylene group is 0.3 mol % or less and the relationship between the viscosity-average polymerization degree (P) and a modification rate (S)(mol %) of the alkyl group satisfies Formula (1):

$$50 \leq S \times P/1.880 < 100 \quad (1); \text{ and}$$

a vinyl alcohol polymer (B) having a saponification degree of 65 mol % or more and a viscosity-average polymerization degree of 600 or more, wherein a mass ratio between the vinyl alcohol polymer (A) and the vinyl alcohol polymer (B) (A/B) is 10/90 to 55/45.

2. The solution or dispersion of claim 1, wherein a block character of the residual vinyl ester groups in the vinyl alcohol polymer (A) is 0.6 or less.

3. The solution or dispersion of claim 1, wherein the terminal alkyl group has 8 to 15 carbon atoms.

4. The solution or dispersion of claim 1, wherein the terminal alkyl group is a straight-chain alkyl group or a branched alkyl group.

5. A method for manufacturing a vinyl resin, comprising conducting suspension-polymerization of vinyl compounds in the presence of the solution or dispersion of claim 1.

6. The method of claim 5, comprising:
charging a pre-prepared solution or dispersion comprising the dispersion stabilizer and methanol or a compound (C) of formula (I) in a reactor; and then initiating suspension polymerization:

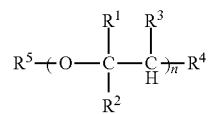

(I)

wherein $R^1$, $R^2$ and $R^5$ represent, independently of each other, a hydrogen atom or an alkyl group having 1 to 6 carbon atoms;

$R^3$ represents a hydrogen atom, an alkyl group having 1 to 6 carbon atoms or a hydroxyalkyl group having 1 to 6 carbon atoms;

$R^4$ represents a hydrogen atom, a hydroxyl group or an alkoxyl group having 1 to 6 carbon atoms; and n represents an integer of 1 to 6.

7. The method of claim 5, wherein the suspension polymerization is conducted at a temperature of 60° C. or higher.

* * * * *